US006843511B2

(12) United States Patent
Barry

(10) Patent No.: US 6,843,511 B2
(45) Date of Patent: Jan. 18, 2005

(54) MECHANICAL LOCKING SYSTEM FOR MARINE LOADING ARM COUPLER

(75) Inventor: Leon K. Barry, Bellingham, WA (US)

(73) Assignee: ConocoPhillips Company, Houston, TX (US)

( * ) Notice: Subject to any disclaimer, the term of this patent is extended or adjusted under 35 U.S.C. 154(b) by 12 days.

(21) Appl. No.: 10/269,521

(22) Filed: Oct. 11, 2002

(65) Prior Publication Data

US 2004/0070206 A1 Apr. 15, 2004

(51) Int. Cl.[7] ................................................ F16L 35/00
(52) U.S. Cl. ........................ 285/320; 285/920; 285/322
(58) Field of Search ................................. 285/320, 920, 285/322

(56) References Cited

U.S. PATENT DOCUMENTS

| | | | | |
|---|---|---|---|---|
| 1,910,706 A | * | 5/1933 | Malzard | 285/314 |
| 2,696,993 A | * | 12/1954 | Buckler | 137/614.06 |
| 3,558,161 A | * | 1/1971 | Bormioli | 285/27 |
| 3,695,635 A | * | 10/1972 | Paddington | 285/38 |
| 4,113,283 A | * | 9/1978 | Curtis et al. | 285/12 |
| 4,138,149 A | * | 2/1979 | Bormioli | 285/320 |
| 4,142,740 A | * | 3/1979 | Wilms | 285/18 |
| 4,202,567 A | * | 5/1980 | Paddington | 285/18 |
| 4,222,591 A | * | 9/1980 | Haley | 285/18 |
| 4,268,071 A | * | 5/1981 | Hanchen et al. | 285/18 |
| 4,515,182 A | | 5/1985 | LeDevehat | |
| 4,553,777 A | * | 11/1985 | Paddington | 285/420 |
| 4,722,557 A | * | 2/1988 | Bormioli | 285/18 |
| 4,923,219 A | * | 5/1990 | Bormioli | 285/18 |

* cited by examiner

Primary Examiner—Eric K. Nicholson
(74) Attorney, Agent, or Firm—Kameron D. Kelly

(57) ABSTRACT

Mechanical lock system for preventing disengagement of a marine loading arm from an inlet/outlet port of a marine tanker by physically restraining rotation of a collar of a quick-connect coupler relative to a main body of the quick-connect coupler.

24 Claims, 3 Drawing Sheets

MECHANICAL LOCKING SYSTEM FOR MARINE LOADING ARM COUPLER

BACKGROUND OF THE INVENTION

1. Field of the Invention

The present invention relates generally to couplers for connecting marine loading arms to inlet/outlet ports of marine tankers. In another aspect, the invention concerns a mechanical locking mechanism for maintaining proper engagement between a quick-connect coupler of a marine loading arm and a flange on the inlet/outlet port of a tanker.

2. Description of the Prior Art

Marine loading arms have been used for years to transfer fluids (e.g., oil, gas, liquified natural gas, etc.) between land-based terminals and marine tankers. Typically, the fluid connection between the marine loading arm and the inlet/outlet port of the tanker is formed by a quick-connect coupler attached to the distal end of the marine loading arm. Such a quick-connect coupler forms a fluid tight connection with the flange of the tanker without requiring bolting of the marine loading arm to the tanker flange. Thus, quick-connect couplers allow marine loading arms to be rapidly connected and disconnected from the tanker.

One drawback of conventional quick-connect couplers is the increased risk of fluid leakage between the coupler and the tanker flange due to operator error or mechanical malfunction of the coupler. In fact, improper engagement of a quick-connect coupler with a tanker flange has been identified as the cause of at least one marine oil spill. Thus, a system for ensuring and maintaining proper engagement between a quick-connect coupler of a marine loading arm and a tanker flange would not only help protect the environment but could also save millions of dollars in clean-up costs.

OBJECTS AND SUMMARY OF THE INVENTION

It is, therefore, an object of the present invention to provide a mechanical lock system for ensuring and maintaining proper engagement between a marine loading arm coupler and a tanker flange. Other objects and advantages of the present invention will be apparent from the following detailed description of the preferred embodiment and appended drawings.

Accordingly, in one embodiment of the present invention, there is provided a coupler for connecting a marine loading arm to a flange of a tanker. The coupler comprises a body, a plurality of jaws, a collar, and a mechanical lock. The body is adapted to engage the flange. The jaws are pivotally coupled to the body and shiftable between a disengaged position wherein the jaws are disengaged from the flange, and an engaged position wherein the jaws engage the flange and secure the body to the flange. The collar is rotatably mounted on the body and operable to shift the jaws between the engaged position and the disengaged position via rotation of the collar relative to the body. The mechanical lock is shiftable between an unlocked position wherein the mechanical lock is decoupled from the body and the collar, and a locked position wherein the mechanical lock is coupled to the body and the collar. The mechanical lock is operable to substantially prevent rotation of the collar relative to the body when the mechanical lock is in the locked position.

In another embodiment of the present invention, there is provided a method of connecting a marine loading arm to a flange of a tanker comprising the steps of: (a) placing a body of a coupler adjacent the flange; (b) rotating a collar of the coupler relative to the body, thereby causing a plurality of jaws of the coupler to engage the flange and couple the body to the flange; and (c) coupling a mechanical lock to the body and the collar, thereby substantially preventing rotation of the collar relative to the body.

In yet another embodiment of the present invention, there is provided a mechanical lock operable to prevent decoupling of a marine loading arm from a flange of a tanker by restraining rotation of a coupler collar relative to a coupler body. The mechanical lock comprises a generally E-shaped rigid body including a side portion, a normally upper leg, a middle leg, and a normally lower leg. The normally upper leg and middle leg at least partly define a normally upper opening therebetween. The normally lower leg and middle leg at least partly define a normally lower opening therebetween. The normally upper leg includes a proximal end proximate the side portion and a distal end spaced from the side portion. The normally upper leg includes a protruding catch positioned proximate the distal end and extending toward the middle leg.

BRIEF DESCRIPTION OF THE DRAWING FIGURES

Preferred embodiments of the present invention are described in detail below with reference to the attached drawing figures, wherein.

DETAILED DESCRIPTION OF THE PREFERRED EMBODIMENT

Figure 1:
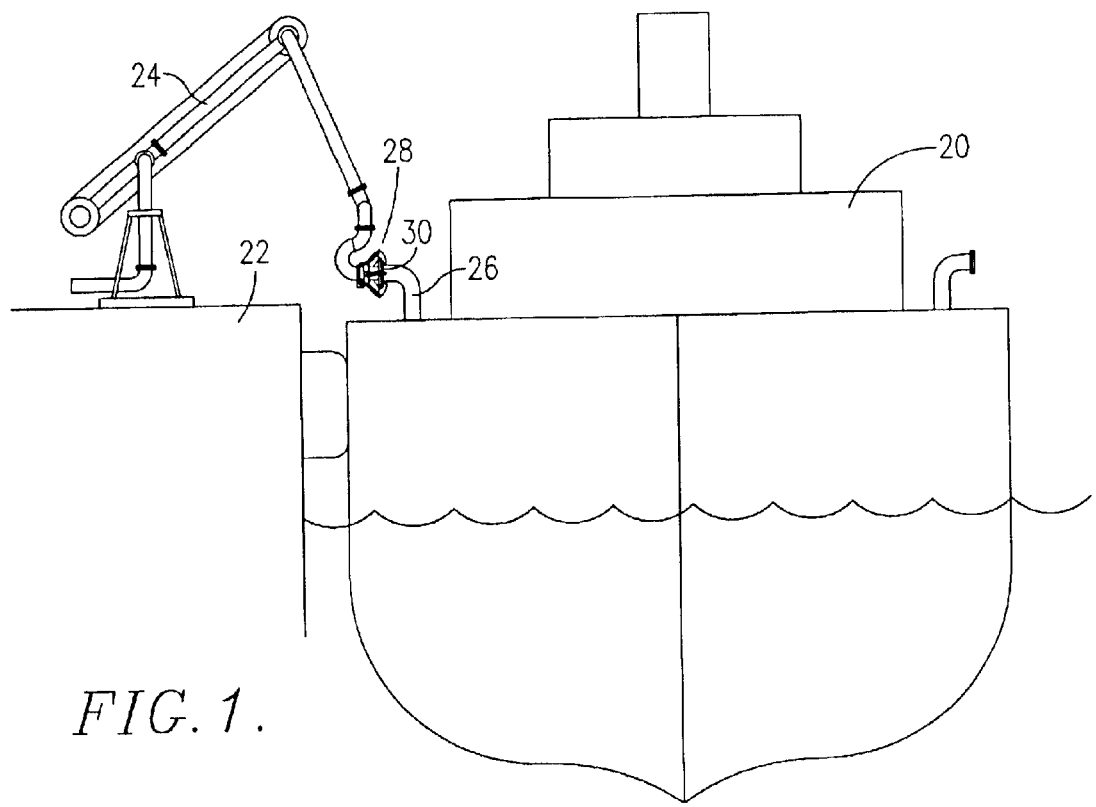
FIG. 1 is a side view of a tanker positioned adjacent a pier, particularly illustrating a quick-connect coupler connecting a marine loading arm to a flange of the tanker so that fluids can be transferred between the marine loading arm and the tanker.
Figures 2, 3:
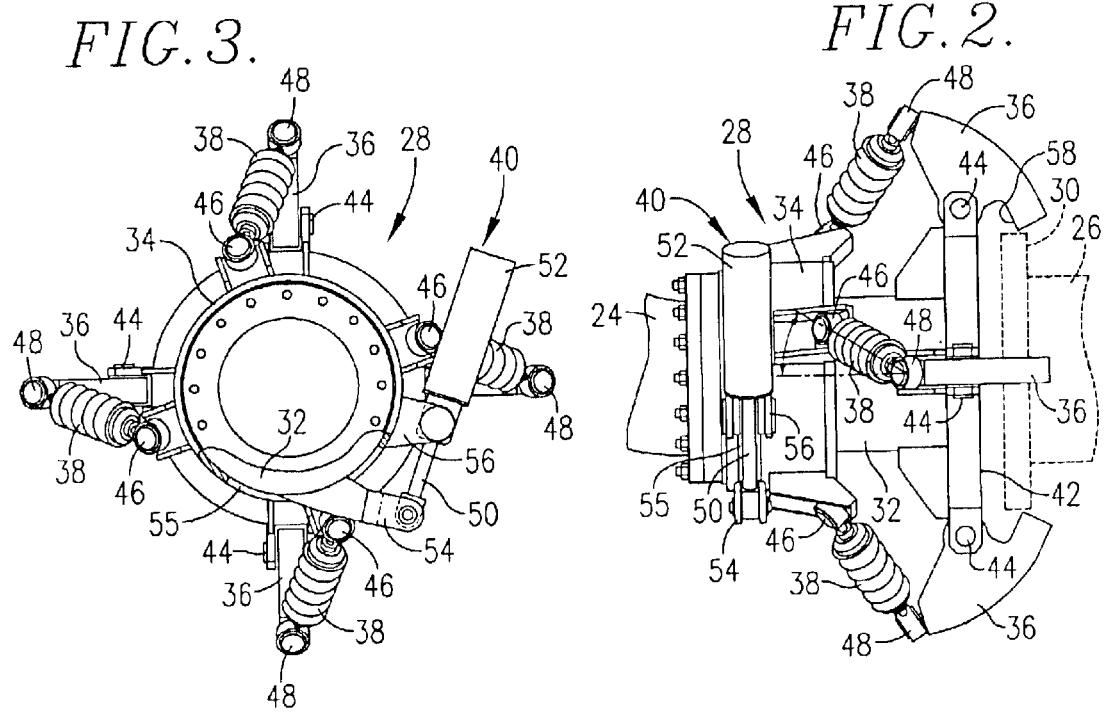
FIG. 2 is an enlarged side view of the quick-connect coupler in an open position, particularly illustrating the jaws of the coupler being disengaged from the flange of the tanker with the struts of the coupler in an under-center position.
FIG. 3 is a partial end view of the quick-connect coupler illustrated in FIG. 2, with certain portions being cut away to illustrate the slot in the rotating collar of the coupler.

Referring initially to FIG. 1, a marine tanker 20 is positioned adjacent a pier 22 for loading or unloading fluids into or out of tanker 20 via a marine loading arm 24. Tanker 20 includes an inlet/outlet port 26 for providing fluid communication between marine loading arm 24 and tanker 20. A quick-connect coupler 28 is attached to a distal end of marine loading arm 24 and is operable to fluidly connect marine loading arm 24 to inlet/outlet port 26 by engaging a flange 30 of inlet/outlet port 26. Quick-connect coupler 28 is preferably a commercially available marine loading arm hydraulic coupler. Suitable hydraulic couplers are available from MIB International, Ltd., England under the commercial designation "Quick Connect/Disconnect Coupler (QCDC)."

Referring to FIGS. 2–7, quick-connect coupler 28 preferably comprises a main body 32, a rotatable collar 34, a plurality of jaws 36, a plurality of struts 38, and a linear actuator 40. Body 32 is rigidly coupled to a distal end of marine loading arm 24 and defines an internal passageway through which fluids can be transferred between port 26 and marine loading arm 24 via coupler 28. A distal end of body 32 presents a face 42 that is adapted to sealingly engage flange 30 when coupler 28 is connected to port 26. Collar 34 is mounted on body 32 in a manner which allows collar 34 to rotate relative to body 32, while axial shifting of collar 34 relative to body 32 is substantially restrained. Jaws 36 are pivotally coupled to main body 32 via pivots 44 positioned proximate the distal end of body 32. Each jaw 36 pivots relative to body 32 on a pivot axis that is substantially perpendicular to the axis of rotation of collar 34. Each strut 38 includes a first end 46 pivotally coupled to collar 34 and a second end 48 pivotally coupled to a respective jaw 36. Preferably, struts 38 include a compressible outer spring and internal telescopically interfitted components. Linear actuator 40 includes first and second members 50, 52 and is operable to adjust the linear distance between opposite ends of first and second members 50, 52. Preferably, linear actuator 40 is a hydraulic cylinder. Main body 32 includes a first coupling element 54 protruding outwardly through a slot 55 in collar 34. Collar 34 includes a second coupling element 56 protruding outwardly therefrom. An end of first member 50 is pivotally coupled to main body 32 via first coupling element 54, while an end of second member 52 is pivotally coupled to collar 34 via second coupling element 56. Thus, linear actuator 40 is extendable in a direction that is substantially perpendicular to the axis of rotation of collar 34.

Figure 5:
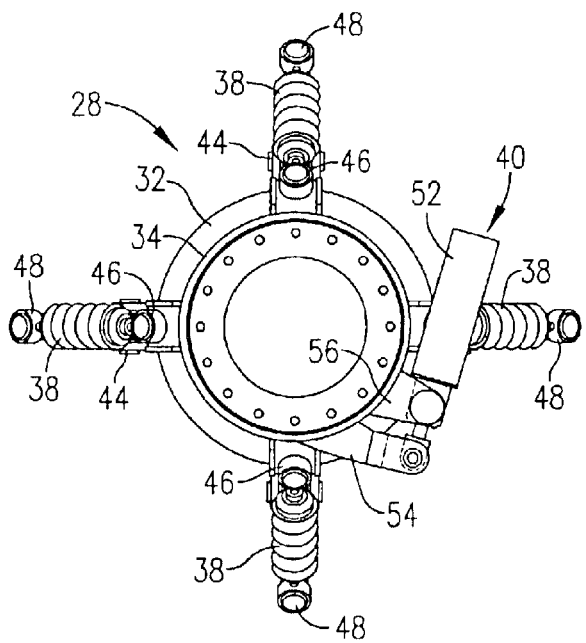
FIG. 5 is an end view of the quick-connect coupler illustrated in FIG. 4.
Figure 4:
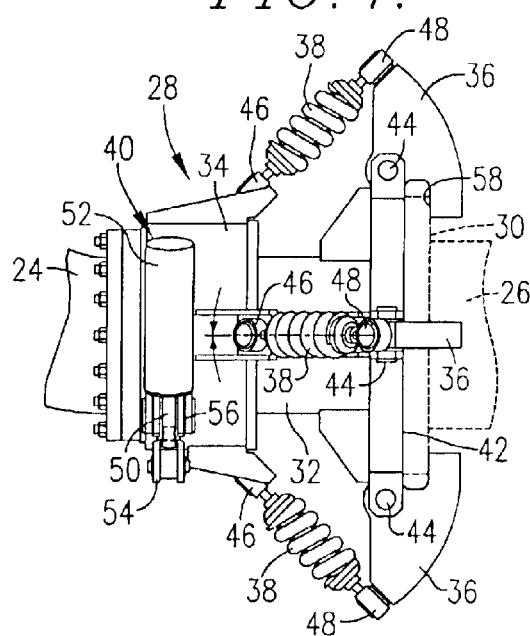
FIG. 4 is an enlarged side view of the quick-connect coupler in an engaged position, particularly illustrating the jaws engaging the tanker flange with the struts in a center position.

Linear actuator 40 is shiftable between an extended position (shown in FIGS. 2 and 3) and a partially retracted position (shown in FIGS. 4 and 5). Shifting of linear actuator 40 from the extended position to the partially retracted position causes rotation of collar 34 relative to main body 32. Such rotation of collar 34 relative to body 32 shifts struts 38 from the skewed (i.e., under-center) position (shown in FIGS. 2 and 3) to the center position (shown in FIGS. 4 and 5). The shifting of struts 38 from the under-centered position to the centered position causes jaws 36 to pivot on hinge 44 from a disengaged position (shown in FIGS. 2 and 3) to an engaged position (shown in FIGS. 4 and 5). When jaws 36 are in the engaged position, an engagement surface 58 of jaws 36 engages the back of flange 30 and forces flange 30 to sealingly engage face 42 of main body 32. Further, when jaws 36 are in the engaged position, struts 38 are under compression so that jaws 36 continually exert a holding force on the back of flange 30 to secure flange 30 against face 42.

Figure 7:
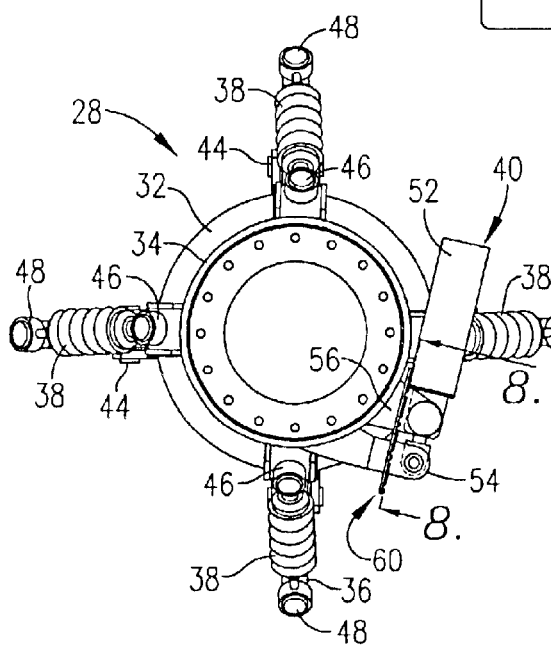
FIG. 7 is an end view of the quick-connect coupler illustrated in FIG. 6.
Figure 6:
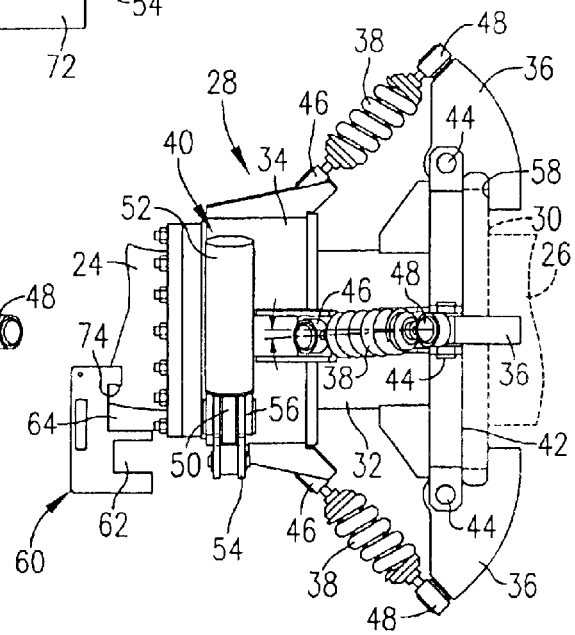
FIG. 6 is an enlarged side view of the quick-connect coupler in an engaged and locked position, particularly illustrating the jaws engaging the tanker flange with the struts in an over-center position and a mechanical lock positioned for locking the jaws in the engaged and locked position.

Linear actuator 40 is further shiftable between the partially retracted position (shown in FIGS. 4 and 5) and a fully retracted position (shown in FIGS. 6 and 7). Shifting of linear actuator 40 from the partially retracted position to the fully retracted position causes collar 34 to further rotate relative to body 32 so that struts 38 shift past the center position (shown in FIGS. 4 and 5) and into an over-centered position (shown in FIGS. 6 and 7). When linear actuator 40 is in the fully retracted position and struts 38 are in the over-centered position, jaws 36 are in a fully engaged and locked position with struts 38 being compressed so that jaws 36 continually force flange 30 against face 42 of main body 32.

Figure 8:
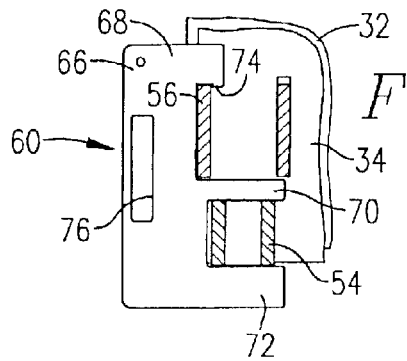
FIG. 8 is an enlarged partial sectional view taken along line 8—8 in FIG. 7, particularly illustrating the mechanical lock in the locked position, preventing rotation of the collar relative to the body.

Referring to FIGS. 6 through 8, when linear actuator 40 is in the fully retracted position with jaws 36 being in the fully engaged position, a generally E-shaped mechanical lock 60 can be manually slid over first and second coupling elements 54, 56 so that first and second coupling elements are received in registry in first and second spaced-apart openings 62, 64 of mechanical lock 60. When first and second coupling elements 54, 56 are received in first and second openings 62, 64 of mechanical lock 60 (shown in FIG. 8), mechanical lock 60 substantially prevents shifting of linear actuator 40 out of the fully retracted position. Preferably, mechanical lock 60 can only be slid over first and second coupling elements 54, 56 when linear actuator 40 is in the fully retracted position with jaws 36 fully engaging flange 30 and struts 38 being in the over-centered position. Thus, requiring mechanical lock 60 to be placed over first and second coupling elements 54, 56 prior to transferring fluid through coupler 28 ensures that quick-connect coupler 28 is in the proper fully engaged position relative to flange 30 before fluid flows between inlet/outlet port 26 and marine loading arm 24. Further, mechanical lock 60 prevents disengagement of quick-connect coupler 28 and flange 30 by substantially preventing rotation of collar 34 relative to body 32, thereby substantially preventing shifting of jaws 36 out of the fully engaged position.

Figure 9:
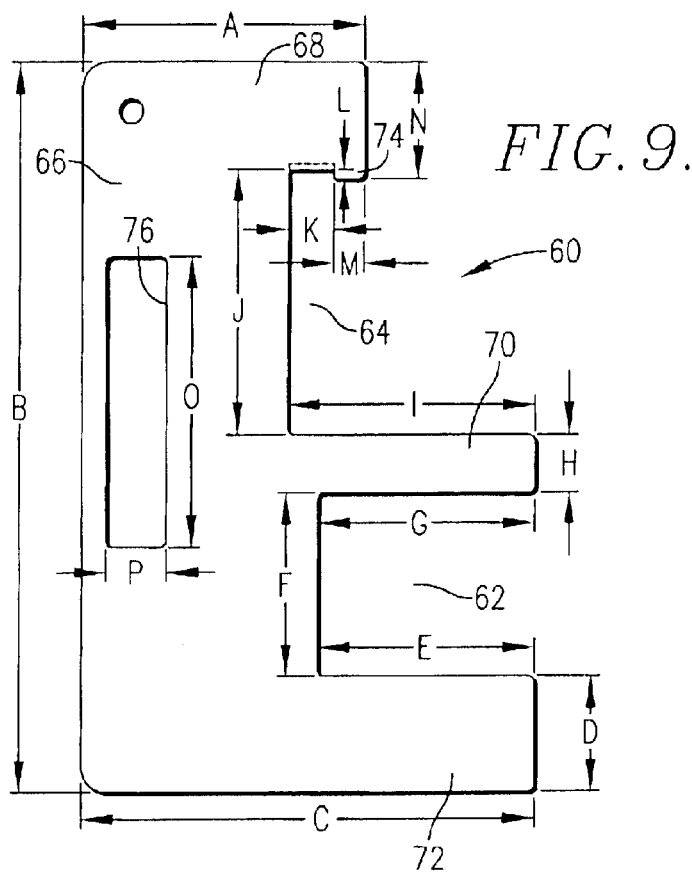
FIG. 9 is a side view of a mechanical lock constructed in accordance with the principles of the present invention.
Figure 10:
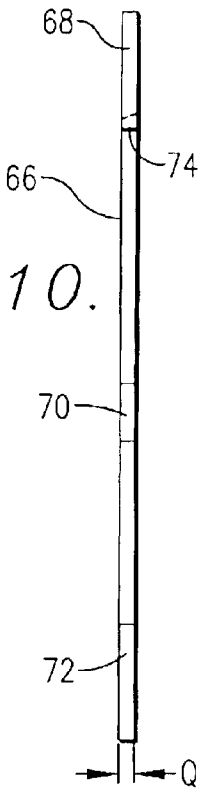
FIG. 10 is an end view of the mechanical lock illustrated in FIG. 9.
Figure 11:
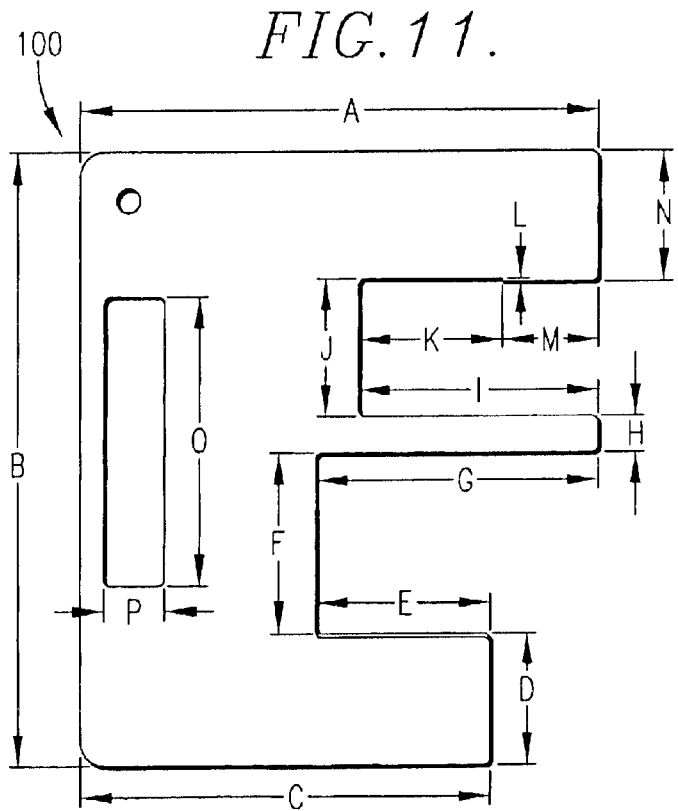
FIG. 11 is a side view of an alternative mechanical lock constructed in accordance with the principles of the present invention.
Figure 12:
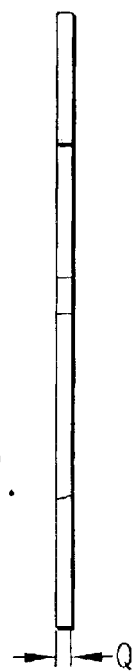
FIG. 12 is an end view of the mechanical lock illustrated in FIG. 11.

Referring to FIGS. 9 and 10, mechanical lock 60 generally includes a side portion 66, a normally upper leg 68, a middle leg 70, and a normally lower leg 72. Legs 68, 70, 72 extend from side portion 66 in substantially the same direction. First opening 62 is cooperatively defined by edges of normally lower leg 72, side portion 66, and middle leg 70. Second opening 64 is cooperatively defined by edges of middle leg 70, side portion 66, and normally upper leg 68. Normally upper leg 68 presents a protruding catch 74 positioned proximate the distal end of normally upper leg 68 and extending toward middle leg 70. Catch 74 is operable to attach mechanical lock 60 to second coupling element 56 (shown in FIG. 8), so that mechanical lock 60 can be self-supported on first and second coupling elements 54, 56 (shown in FIG. 8). Side portion 66 defines a hand opening 76 sized to receive four fingers of a human hand to thereby facilitate manual grasping, holding, and manipulation of mechanical lock 60. Mechanical lock 60 is preferably formed of a metallic plate having a substantially uniform thickness. Preferably, mechanical lock 60 has a thickness in the range of from about 0.15 to about 1.0 inches, more preferably in the range of from about 0.25 to about 0.5 inches. Mechanical lock 60 must have a strength sufficient to prevent extension of linear actuator 40 (shown in FIGS. 2–7) out of the fully retracted position. Thus, it is preferred for mechanical lock 60 to be integrally formed of a material having a yield strength of at least about 50 ksi (i.e., 50,000 psi), more preferably at least about 75 ksi, and most preferably at least 100 ksi. Most preferably, mechanical lock 60 is formed of ASTM 514 or stronger structural steel. In order to facilitate manual manipulation of mechanical lock 60, it is preferred for the total weight of mechanical lock 60 to be less than about 40 pounds, more preferably the total weight of mechanical lock 60 is in the range of from about 2 to about 25 pounds.

Referring to FIGS. 9–12, mechanical lock 60 (shown in FIGS. 9 and 10) is configured for use with a commercially available marine loading arm coupler sold under the designation "16 inch QCDC Coupler," available from MIB International, Ltd., England, while mechanical lock 100 (shown in FIGS. 11 and 12) is configured for use with a commercially available marine loading arm coupler sold under the designation "12 inch QCDC Coupler," available from MIB International, Ltd., England. The configuration of mechanical locks 60, 100 is similar and can be defined by dimensions A–Q shown in FIGS. 9–12. Table 1, below, provides preferred values for dimensions A–Q of mechanical locks 60 and 100.

TABLE 1

| Dimension | Mechanical Lock 60 (FIGS. 9 and 10) | Mechanical Lock 100 (FIGS. 11 and 12) |
|---|---|---|
| A | 10¾" | 5¹³⁄₁₆" |
| B | 12¾" | 10" |
| C | 8½" | 9⅜" |
| D | 2¾" | 2⅜" |
| E | 5" | 4½" |
| F | 3¾" | 3¹³⁄₁₆" |
| G | 5⅞" | 4½" |
| H | ¾" | 1³⁄₁₆" |
| I | 5⅞" | 5⅓" |
| J | 2⅞" | 5" |
| K | 3" | 1⁵⁄₁₆" |
| L | ¹⁄₁₆" | ⅓" |
| M | 2" | ⅝" |
| N | 2⅝" | 2⅜" |
| O | 6" | 6" |
| P | 1¼" | 1¼" |
| Q | ⁵⁄₁₆" | ⁵⁄₁₆" |

In addition to the dimensions provided in Table 1, mechanical lock 60 preferably includes a 15° back-to-front bevel on the top edge of normally lower leg 72. Further, mechanical lock 100 preferably includes a 20° front-to-back bevel on the bottom edge of normally upper leg 68.

Although the specific configurations of mechanical locks 60 and 100 are described in detail herein, it should be understood that the present invention is not limited to the specific embodiments. Rather, the present invention is intended to encompass mechanical locks with configurations that vary from the mechanical locks described herein.

Referring now to FIGS. 1–12, in operation, marine loading arm 24 can be coupled to flange 30 of tanker 20 by first manipulating marine loading arm 24 so that face 42 of body 32 of coupler 28 engages flange 30. Once face 42 is engaged with flange 30, linear actuator 40 can be shifted from the extended position (shown in FIGS. 2 and 3) to the fully retracted position (shown in FIGS. 6 and 7). Shifting of linear actuator 40 from the extended position to the fully retracted position causes shifting of jaws 36 from the disengaged position (shown in FIGS. 2 and 3) to the fully engaged position (shown in FIGS. 6 and 7). When jaws 36 are in the fully engaged position, flange 30 is securely held against face 42 of body 32. Once linear actuator 40 is in the fully retracted position, mechanical lock 60 can be manually retrieved from a remote storage location, manually positioned adjacent first and second coupling elements 54, 56, and manually shifted in a first direction to cause mechanical lock 60 to slide over first and second coupling elements 54, 56 so that first and second coupling elements 54, 56 are received in first and second openings 62, 64 of mechanical lock 60. Once first and second coupling elements 54, 56 are received in first and second openings 62, 64 of mechanical lock 60, mechanical lock 60 can be manually shifted in a second direction, generally perpendicular to the first direction, so that catch 74 engages a back portion of second coupling element 56 to thereby couple mechanical lock 60 to first and second coupling elements 54, 56. When mechanical lock 60 is in the locked position, shifting of linear actuator 40 out of the fully retracted position is prevented, thereby preventing shifting of jaws 36 out of the fully engaged position.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A coupler for connecting a marine loading arm to a flange of a marine tanker, said coupler comprising:

a body adapted to engage the flange;

a plurality of jaws pivotally coupled to the body and shiftable between a disengaged position wherein the jaws are disengaged from the flange and an engaged position wherein the jaws engage the flange and secure the body to the flange;

a collar rotatably mounted on the body and operable to shift the jaws between the engaged position and the disengaged position via rotation of the collar relative to the body; and a mechanical lock shiftable between an unlocked position wherein the mechanical lock is decoupled from the body and the collar and a locked position wherein the mechanical lock is coupled to the body and the collar, said mechanical lock being operable to substantially prevent rotation of the collar relative to the body when the mechanical lock is in the locked position, said body presenting a first coupling element projecting outwardly from the body, said collar presenting a second coupling element projecting outwardly from the collar, said mechanical lock defining first and second spaced-apart openings, said first and second coupling elements being received in the first and second openings respectively when the mechanical lock is in the locked position.

2. The coupler according to claim 1, said mechanical lock being shiftable into the locked position only when the jaws are in the engaged position, said mechanical lock being operable to substantially prevent shifting of the jaws out of the engaged position.

3. The coupler according to claim 1, said mechanical lock being shiftable from the unlocked position to the locked position by sliding the mechanical lock over the first and second coupling elements.

4. The coupler according to claim 1, said mechanical lock being generally E-shaped, said mechanical lock including a side portion and three legs extending from the side portion, said first and second openings being defined between the legs.

5. The coupler according to claim 4, said side portion defining a hand opening extending therethrough, said hand opening being sized to receive at least a portion of a human hand to thereby aid in manually grasping the mechanical lock.

6. The coupler according to claim 4, said mechanical lock being formed of a metallic plate having a substantially uniform thickness.

7. The coupler according to claim 6, said metallic plate having a thickness in the range of from about 0.15 to about 1.0 inches, said metallic plate being integrally formed of a material having a yield strength of at least about 50 ksi.

8. The coupler according to claim 1; and a linear actuator having a first member pivotally coupled to the first coupling element and a second member pivotally coupled to the second coupling element, said linear actuator being operable to shift the first coupling element relative to the second coupling element, thereby rotating the collar relative to the body and shifting the jaws between the engaged and disengaged positions.

9. The coupler according to claim 8, said linear actuator being shiftable between an extended position and a retracted position, said first and second coupling elements being spaced farther from one another when the linear actuator is in the extended position than when the linear actuator is in the retracted position, said extended position of the linear actuator corresponding with the disengaged position of the jaws, said retracted position of the linear actuator corresponding with the engaged position of the jaws.

10. The coupler according to claim 9, said first and second openings being spaced from one another a distance that corresponds to the distance between the first and second coupling elements when the linear actuator is in the retracted position.

11. The coupler according to claim 10, said mechanical lock preventing shifting of the linear actuator out of the retracted position when the mechanical lock is in the locked position.

12. The coupler according to claim 11, said linear actuator being a hydraulic cylinder.

13. The coupler according to claim 8; and a plurality of struts each having a first end pivotally coupled to the collar and a second end pivotally coupled to a respective one of the jaws.

14. The coupler according to claim 13, said struts being operable to transform the rotary motion of the collar relative to the body into pivotal motion of each jaw relative to the body, each of said jaws being pivotal relative to the body on a pivot axis that is substantially perpendicular to the axis of rotation of the collar.

15. A method of connecting a marine loading arm to a flange of a marine tanker, said method comprising the steps of:

(a) placing a body of a coupler adjacent the flange;

(b) rotating a collar of the coupler relative to the body, thereby causing a plurality of jaws of the coupler to engage the flange and couple the body to the flange; and (c) coupling a mechanical lock to the body and the collar, thereby substantially preventing rotation of the collar relative to the body, said mechanical lock defining first and second spaced apart openings, said body presenting a first outwardly projecting coupling element, said collar presenting a second outwardly projecting coupling element, step (c) including sliding the mechanical lock in a first direction over the first and second coupling elements so that the first and second coupling elements are received in the first and second openings respectively.

16. The method according to claim 15, said mechanical lock including a protruding catch positioned proximate the first opening, step (c) including, after the mechanical lock has been slid over the first and second coupling elements, shifting the mechanical lock in a second direction generally perpendicular to the first direction so that the catch engages the first coupling element, thereby supporting the mechanical lock on the first and second coupling elements.

17. The method according to claim 15, during step (b), said mechanical lock being decoupled from the body and the collar.

18. The method according to claim 15; and (d) prior to step (c), manually retrieving the mechanical lock from a storage location spaced from the body and the collar.

19. A mechanical lock operable to prevent decoupling of a marine loading arm from a flange of a marine tanker by restraining rotation of a coupler collar relative to a coupler body, said mechanical lock comprising:

a generally E-shaped rigid body including a side portion, a normally upper leg, a middle leg, and a normally lower leg, said normally upper leg and said middle leg at least partly defining a normally upper opening therebetween, said normally lower leg and said middle leg at least partly defining a normally lower opening therebetween, said normally upper leg including a proximal end proximate the side portion and a distal end spaced from the side portion, said normally upper leg including a protruding catch positioned proximate the distal end and extending toward the middle leg.

20. The mechanical lock according to claim 19, said side portion defining a hand opening extending therethrough, said hand opening being sized to receive at least a portion of a human hand to thereby aid in manually grasping the mechanical lock.

21. The mechanical lock according to claim 19, said rigid body being a metallic plate having a substantially uniform thickness.

22. The mechanical lock according to claim 21, said rigid body having a thickness in the range of from about 0.15 to about 1.0 inches.

23. The mechanical lock according to claim 19, said rigid body being integrally formed of a material having a yield strength of at least about 50 ksi.

24. The mechanical lock according to claim 19, said rigid body having a weight in the range of from about 2 to about 25 pounds.

* * * * *